Aug. 15, 1967

C. C. FAY

3,336,597

MASTER PISTON ACTUATOR

Filed June 18, 1965

INVENTOR
CLARENCE C. FAY

BY Schramm, Kramer & Stenger

ATTORNEYS

Aug. 15, 1967 C. C. FAY 3,336,597
MASTER PISTON ACTUATOR
Filed June 18, 1965 4 Sheets-Sheet 2

INVENTOR
CLARENCE C. FAY
BY Schramm, Kramer & Stanger
ATTORNEYS

Aug. 15, 1967

C. C. FAY 3,336,597

MASTER PISTON ACTUATOR

Filed June 18, 1965

INVENTOR
CLARENCE C. FAY

BY

ATTORNEYS

INVENTOR
CLARENCE C. FAY

ATTORNEYS

United States Patent Office 3,336,597
Patented Aug. 15, 1967

3,336,597
MASTER PISTON ACTUATOR
Clarence C. Fay, 17211 Edgewater Drive,
Lakewood, Ohio 44107
Filed June 18, 1965, Ser. No. 465,076
16 Claims. (Cl. 60—54.6)

This invention relates to hydraulic systems, and more particularly to plural isolated systems operated by a single manual or pedal operator and means for equalizing the force applied to each of such systems. This invention will be described in relation to a dual hydraulic braking system particularly useful in automotive vehicles, for example, trucks, cars, etc. it being understood, however, that this invention is applicable in any hydraulically operated mechanism which employs plural hydraulic control systems, e.g. hydraulic earth mover controls.

In automotive vehicles the front and rear brakes are more frequently being controlled by two separate hydraulic sub-systems, each sub-system having its own master cylinder, and both being actuated by a single pedal operator. The master cylinders are in communication with a fluid reservoir which provides fluid to the master cylinders. Pistons within the cylinders are driven by the brake pedal and transmit, by a hydraulic means, fluid under pressure sufficient to operate auxiliary brake cylinders located at each wheel to force the brake shoes or plates against a rotating drum or disc, as the case may be. In such hydraulic systems including plural hydraulic sub-systems driven from a single operator, e.g. a brake pedal, it is desirable to provide means for equalizing the force supplied to each separate hydraulic sub-system. Unequal fluid pressure, or piston movement is caused, for example, by uneven wear or adjustment of brake shoes or plates, a slight leak in the line, difference in friction losses in the lines, improper sealing about the pistons, etc. In some automotive vehicles, the front wheel cylinder bore is greater than the rear wheel cylinder bore, requiring a larger fluid volume to actuate the front auxiliary brake cylinders located at the front wheels. Unless compensated for, these and similar conditions cause uneven hydraulic braking action. The present invention provides, therefore, improved equalizing means adapted to respond to differences in resistance offered by the separate hydraulic systems to compensate for such differences and yield more nearly equal braking action at the wheels governed by each piston. Should there be a rupture in a hydraulic line in one of the hydraulic sub-systems, the present invention may be embodied in a device including a safety take-over structure hereinafter more particularly described and operating to by-pass the equalizing means to ensure positive action of at least one set of brakes.

Generally speaking, and in accordance with this invention, differential movement of the piston relative to each other is accomplished by providing a rocking beam cross member coacting between the pistons to transmit an axial force to each of the pistons proportional to the hydraulic resistance of each sub-system. A piston actuator is disposed between the adjacent pistons and coacts between the driving means, such as a push rod or pitman extending from and connected to the foot pedal, and the rocking beam cross member to transmit axially directed components of force from the driving means to the cross member for at least a portion of the stroke of the actuator. Means are also provided coacting between the actuator, and each of the adjacent pistons for transmitting axially directed components of force from the driving means directly to either one of the pistons when the hydraulic resistance of the sub-system actuated by said piston falls below a predetermined value, such as for example as would be caused by a rupture in the line reducing the resistance to the summation of atmospheric pressure and the pressure losses in the line between the rupture in the line and the piston.

With this structure, so long as there is equal pressure in the cylinders, the pistons will move in unison. However, should there be a differential in the pressure in the master cylinders, the rocking beam cross member will allow the coacting piston in the cylinder where the fluid pressure is lower to move relative to the other piston, an extremity of the rocking beam advancing more rapidly on the low pressure side than the extremity on the high pressure side. In the usual cases, this movement is quite limited and will compensate for any pressure differentials such as normally encountered.

As indicated above, there may also be provided means coacting between the actuator and each of the adjacent pistons in the form of safety stops or lugs, for example which are adapted to coact with shoulders at the extremities of the piston should there be any substantial pressure differential, for example, such as caused by a ruptured hydraulic line in one of the hydraulic sub-systems. The amount of travel which must be undergone before the safety device coacting between the actuator and each of the pistons takes over is of the order of 0.0" to 3/16", and should substantial pressure differences occur, the coacting means positively engage the end of the piston movable in the cylinder where there is greater pressure to directly drive the piston in a pressure applying direction so that there will always be available positive braking action in the system having greater resistance or fluid pressure. Thus, within this relatively short distance, effective equalizing can be accomplished when each master cylinder is offering hydraulic resistance to piston movement; and if hydraulic resistance in one of the sub-systems is lost due to the line rupture, for example, the amount of pedal travel necessary to cause take-over and direct drive of the remaining piston is very slight.

This invention may also be embodied in a device including novel means for bleeding air from the master cylinders.

This invention may also be embodied in devices including a divided reservoir with an improved air chamber structure hereinafter described which provides a separate fluid source for each hydraulic system. With the conventional single compartment reservoir, the fluid may be completely drained from the system, if, for example, one of the brake lines is ruptured. Separate reservoirs provide greater protection in that fluid is still available in one set of brakes even if one line is ruptured.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Figure 1:
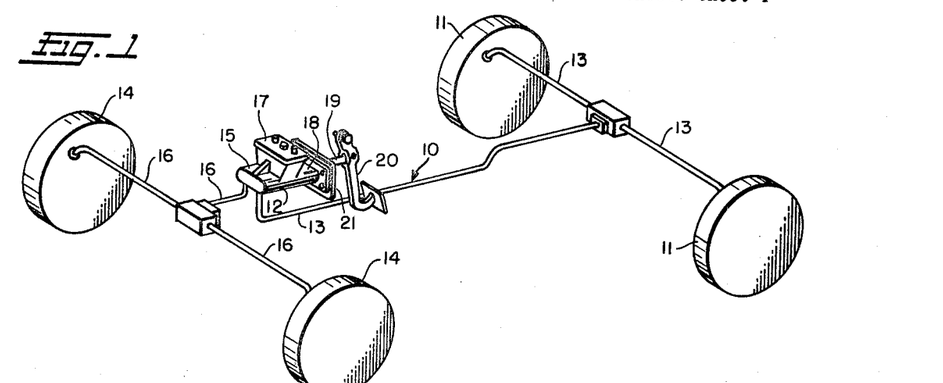
FIG. 1 is a diagrammatic illustration in perspective showing an automotive braking system for separately operating a front wheel brake hydraulic sub-system and a rear wheel brake hydraulic sub-system.

As indicated above, FIG. 1 shows diagrammatically a dual hydraulic braking system for use in an automotive vehicle. One hydraulic sub-system actuates auxiliary cylinders of conventional design located at the front wheels 14 and a separate hydraulic sub-system actuates auxiliary wheel cylinders located at the rear wheel brake assemblies 11. There is provided a master piston actuator 18 having on one side thereof a master cylinder portion indicated at 15 which communicates by means of hydraulic lines 16 with the auxiliary pistons in brake assemblies 14 at the front wheels for actuating the braking mechanism which is of conventional design of either the drum type, or the disc type. A separate master cylinder portion 12 communicates by means of hydraulic lines 13 to each of the rear link assemblies 11 for actuating conventional auxiliary hydraulic pistons therein. Hydraulic fluid reservoir 17 is conveniently mounted integrally with the cylinder housing, and the entire assembly which is usually a single casting secured to the fire wall 21. The master piston actuator assembly is driven from a single manually operated foot pedal 20 conventionally mounted within the cab of the automotive vehicle, not shown, connected to and driving a pitman bar which, as will be hereinafter more particularly pointed out, is removably connected to the master piston actuator. This assembly makes possible easy removal and replacement of the master piston actuator by simply disconnecting hydraulic lines 13 and 16 removing the bolts securing the housing 18 to the fire wall 21, and as will hereinafter be pointed out slidably disconnecting the coupling of the pitman 19 with the actuator assembly. Referring generally to FIGS. 2 to 5, 9 and 10 and more particularly to FIGS. 2 and 3, there is shown the master piston actuator assembly 18 comprising a pair of adjacently disposed master cylinders 12 and 15 which preferably, although not essentially, lie in the same horizontal plane. The fluid reservoir assembly 17 is compartmented into isolated sections or reservoirs 25 and 26, each section communicating with its respective master cylinder through a pair of spaced passageways 27 and 28, passageway 27 being restricted in a conventional way to limit back flow on the pressuring stroke. Each master cylinder communicates with its respective hydraulic brake line, e.g. line 13 through a suitable fitting 29 which is conveniently threadably engaged in passageway 30 communicating with the end 31 of the master cylinder. A hydraulic sub-system as that term is used herein, includes a piston, a cylinder, hydraulic lines, hydraulic fluid in the system, and servo motor means, such as, the auxiliary hydraulic cylinder-pistons at each of the wheels, which are not shown.

Figures 2, 3:
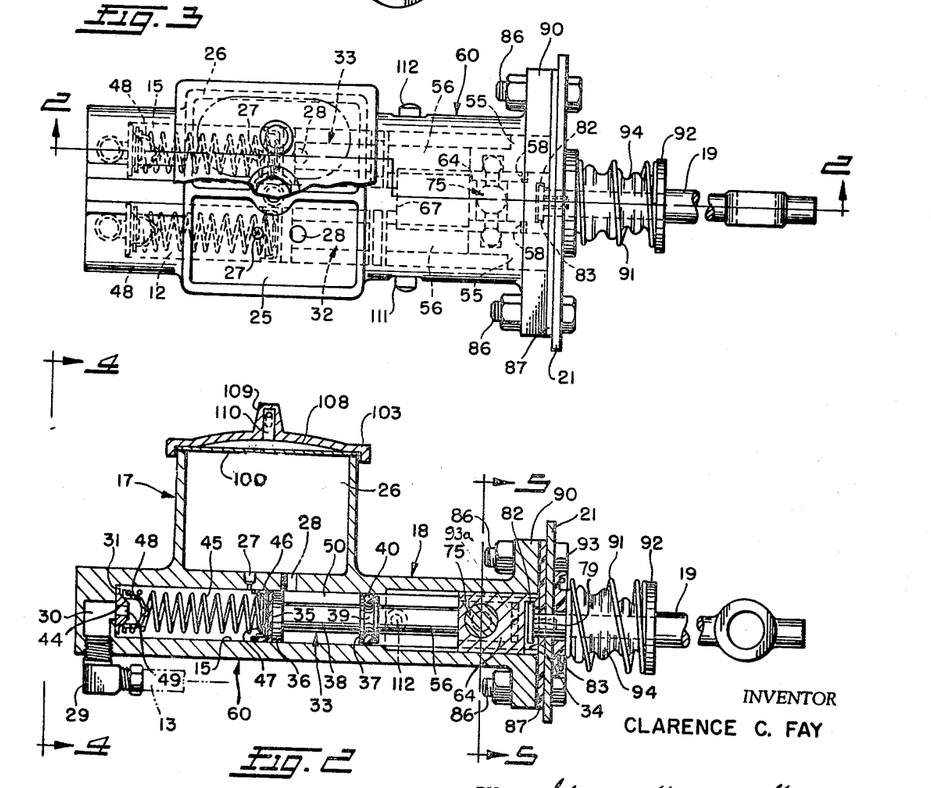
FIG. 2 is a cross-sectional view of a master piston actuator of the present invention taken on the stepped plane indicated by the line 2—2 in FIG. 3.
FIG. 3 is a top plan view of a master piston actuator assembly embodying the present invention.
Figure 4:
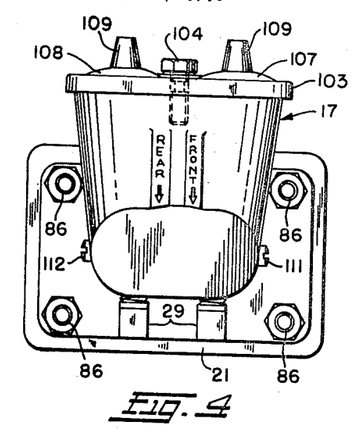
FIG. 4 is an end view of the master piston actuator of FIGS. 2 and 3.
Figure 5:
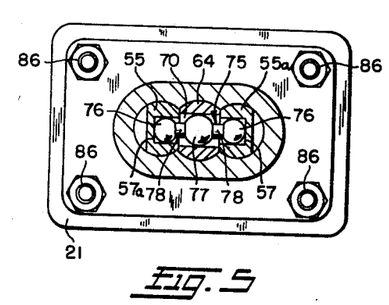
FIG. 5 is a view partially in cross-section of the master piston actuator of FIGS. 2 and 3 and taken in the plane indicated by the line 5—5 in FIG. 2.
Figure 6:
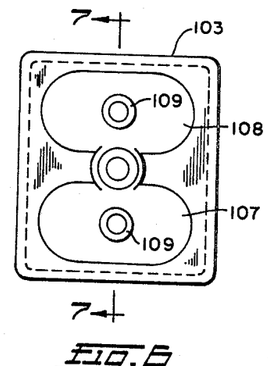
FIG. 6 is a top view of a fluid reservoir cover useful with the master piston actuators of the present invention.

Pistons 32 and 33, respectively, are insertable in the other open end 34 of master cylinders 12 and 15 and are reciprocable therein. The fluid displacing piston end 35 nearest the outlet port 30 has a pair of piston lands 36 and 37 disposed in spaced relation on the piston body 38. Piston land 37 is conveniently provided with a circumferential recess or groove 39 for containing a pliable sealing ring 40.

Spring 45 is disposed in each master cylinder and coacts between cylinder end 31 and the adjacent piston end 35 biasing the piston in the direction away from the outlet port in a pressure relieving direction. A resilient sealing cup 46 coacts between spring 45 and piston head 35. Resilient cup 46 provides a sealing gasket on the pressurizing stroke for forcing the hydraulic fluid from the master cylinders into the brake lines. The spring-cup-piston assembly and operation is conventional. The opposite end of spring 45 surrounds and retains a conventionally designed check valve 48 over the outlet port 30. Check valve 48 is seated on a novel resilient frusto-conically shaped valve seat 44 having an aperture 49 through which the hydraulic fluid is metered to the outlet port 30 for distribution to the brake lines 13 and 16, respectively. Valve seat 44 is designed so that the valve 48 will always be seated on the pressure stroke even when its axis is tilted with respect to the axis of the cylinders 12 or 15.

Figure 9:
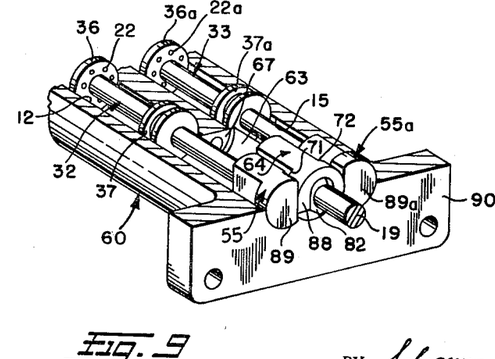
FIG. 9 is a perspective view of a portion of the master piston actuator of the present invention, the cylinder body being shown in cross-section, and the pistons and piston actuator being shown in perspective in position in the cylinder body.

Fluid in each of the reservoirs 25 and 26 is in constant communication with the reciprocating space or chamber 50 surrounding piston rod 38 between the piston lands 36 and 37 for the entire piston stroke. Fluid from chamber 50 replenishes fluid lost or spurted through port 27 by flowing through holes 22 in land 36 (FIG. 9). A conventional multi-fingered leaf check valve (see FIG. 10) controls the flow through holes 22.

Each piston is provided with an adapter 55 disposed on the driving end 56. Adapters 55 and 55a on the two pistons 32 and 33, respectively, are similar but are oppositely configured and in confronting relation when the pistons are normally disposed in non-operating position within the respective master cylinders 12 and 15, respectively. Each of adapters 55 and 55a has a transversely extending opening or socket 57, the axis of which is at right angles to the longitudinal axis of the piston. Socket 57 is adapted to receive one end 76 of rocking beam cross member 75 (FIG. 10), and to allow limited rotational movement of the cross head 75 therein, which limited movement exceeds any demands on the movement of the cross member 75 which may be imposed by the assembly.

An abutment or shoulder 58a and 58 is formed in each of adapters 55a and 55 adjacent the opening or socket 57. Adapters 55 and 55a are each provided with a terminal driving head portion 59 and 59a respectively which is sized and shaped to fit smoothly within the bore of cylinders 12 and 15, respectively, and to coact with piston lands 36 and 36a, and 37 and 37a to keep pistons 32 and 33 operating smoothly within their respective cylinders. Bore 63 extends into the cylinder block 60 between and in overlapping relationship with the master cylinders 12 and 15. Bore 63 does not extend as far into the cylinder block 60 as cylinders 12 and 15 and provides, therefore, an abutment 67 (FIG. 9) which serves as a limit to the piston stroke and prevents damage to the spring, check valve, flexible cup assembly because of the overlap of bore 63 with the bores forming cylinders 12 and 15, respectively, the walls of the latter cylinders are partially removed and enable communication through rocking beam cross bar 75 between the adapters 55 and 55a on each of the pistons 32 and 33, respectively. A piston actuator or carrier 64 is slidable in bore 63 and is disposed between the confronting flats of adapters 55 and 55a. The confronting surfaces 65 and 65a, and 66 (FIG. 10) on the piston actuator 64 and adapters 55, and 55a respectively, are complementarily configured for abutting relationship, albeit a relatively axially sliding relationship.

An opening or bore 70 is formed through the piston actuator 64 at right angles to the longitudinal axis thereof. Bore 70 is in axial alignment with the confronting sockets 57 and 57a in the adapters 55 and 55a when the pistons are in their respective position in master cylinders 12 and 15. A rocking beam cross member or wobble bar 75 extends through the actuator opening 70 and into the confronting sockets 57 and 57a in the adapters 55 and 55a. Cross member 75 is conveniently provided with terminal ball portions 76 at each of its extremities for co-action with desirably spherically shaped sockets 57 and 57a in the piston adapters 55 and 55a. Ball portions 76 are spaced from a centrally located spherical fulcrum element 77 by means of spacing arms 78, thus, when the cross head 75 is assembled with the pistons 32 and 33 with actuators 64 in the cylinder body 60 as best shown in FIG. 9, a single axially directed force on pitman bar 19 is transmitted through the actuator 64 to the rocking beam cross member 75, and then through the arms 78 to the ball portions 76 to the pistons 32 and 33, respectively, through coaction with the sockets 57 in the adapter heads 55 and 55a. Thus, a single axially directed force is transmitted to each of the pistons to drive pistons 32 and 33 in an axial direction and apply pressure to hydraulic fluid contained in the cylinders 12 and 15 ahead of the piston lands 36. Differences in pressure exerted on the high pressure extremities of pistons 32 and 33 result in a differential movement of pistons 32 and 33 in response to the resistance opened by the hydraulic systems, respectively. Because of the slidable relationship existing between adapters 55 and 55a on each of the pistons 32 and 33 and the parallel flat surfaces on piston actuator 64, and because of the ability of rocking beam cross member 75 to rock or wobble within bore 70, one of the pistons 32 or 33 is permitted to lead the other as may be required to establish equal pressure in each of the hydraulic sub-systems.

Figure 10:
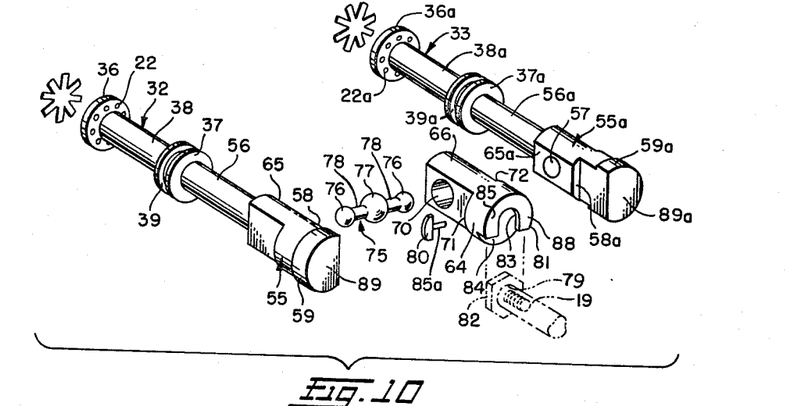
FIG. 10 is an exploded perspective view of the pistons actuating each of the hydraulic sub-systems, the rocking beam cross member which coacts between the pistons, the piston actuator which coacts between the driving means and the rocking beam cross member, the take-over means which operates in the event of failure of one of the hydraulic sub-systems, and partially shown in dotted lines, the end of the driving pitman and its coupler adapted to coact with the piston actuator.
Figure 11:
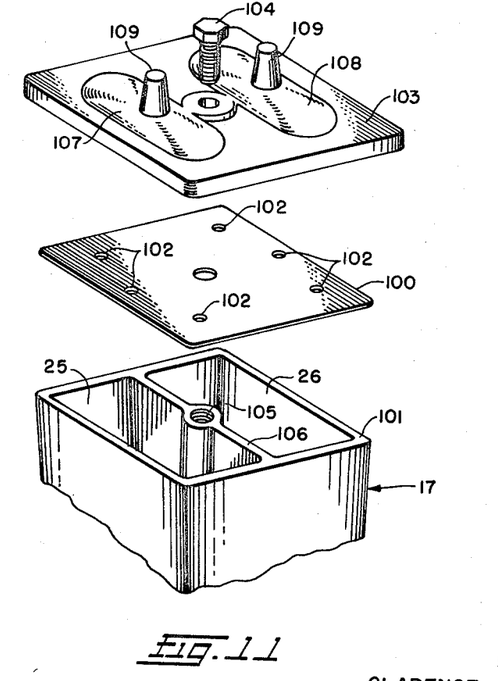
FIG. 11 is an exploded view of the fluid reservoir assembly showing a portion of the reservoir, the gasket, and the cap, and cap fastening means in perspective.

As indicated above, the apparatus of the present invention is provided with a safety take over feature involving the shoulders 58 and 58a on each of piston adapters 55 and 55a, respectively, and lateral coacting shoulders 71 and 72 formed on the actuator 64. Shoulders 71 and 72 are configured for mating engagement with the shoulders 58 and 58a on the adapters 55 and 55a. When the pistons 32 and 33 are equally pressurized by the resistance offered in the respective hydraulic systems, shoulders 71 and 72 on adapter 64 never come in contact with shoulders 58 and 58a on the respective adapter heads 55 and 55a. The spherical surface of portion 77 on rocking beam 75 coacts as a fulcrum with bore 70 and the simultaneous advancement of both pistons 32 and 33 is such that when taken with the normal axial spacing between shoulder 71 and shoulder 58 on piston 32, and the spacing between shoulder 72 and shoulder 58a on piston 33, such shoulders never come in contact with each other. However, when piston 32, for example, leads piston 33 in its movement in an axial direction, shoulder 72 approaches shoulder 58a on piston 33. If the lead exceeds a certain predetermined amount, such as, for example, 3/32" to 3/16", then shoulder 72 will seat upon shoulder 58a of piston 33, and the drive from pitman 19 through actuator 46 will become a direct drive rather than an indirect drive through the cross member 75.

The amount of clearance between the shoulder 72 and 58a, and shoulder 71 and 58 on piston 32 may be varied by inserting shim 80 on either side of the actuator 64. Shim 80 is conveniently provided with a pin 85a sized for a tight fit in bore 93a (FIG. 2) in actuator 64.

The ball portions 76 of cross member 75 are conveniently sized for receipt in sockets 57 with a minimum amount of play. A clearance of 1 to 3 thousandths may be tolerated. If there is too much play between the respective parts, there is a tendency to negate the ability of the compensating piston to differentiate in response to minor differences in piston resistance.

As previously indicated, the diameter of the auxiliary cylinders in brake assemblies 14 and 11, respectively, may be of different size requiring unequal fluid volumes for their operation. This and other situations requiring a differential in fluid volume is mechanically compensated by the shim 80 mounted on the piston actuator 64 adjacent lugs 71 or 72, respectively. For example, if piston 32 were required to deliver a larger volume to the front wheel brake 14, then a shim 80 would be provided adjacent abutment 71 on actuator 64.

In order to make the devices of this invention adaptable to as wide a variety of automotive vehicles as possible, means have been provided in the form of a shim 80 which can be used or not used as the situation may require. In some cases, the wheel cylinders or wheel cups in front and in back are of the same size and require the same volume of pressurized fluid for their actuation. In some cases, however, larger sized wheel cylinders or cups are used in front than in back. The larger cups require, of course, a larger volume of fluid. Since a larger volume of fluid will be moved by piston 32 (FIG. 10), the length of the stroke of piston 32 will be greater than that of piston 33. Accordingly, when the pressure is equalized in each of the hydraulic sub-systems served by pistons 32 and 33, respectively, piston 32 having traveled farther than piston 33 would have its shoulder 58 spaced a greater distance from shoulder 71 than the corresponding shoulder 58a on piston 33 is spaced from its coacting shoulder 72 on actuator 64. In order that the spacing between the shoulders on the pistons and the shoulders on the actuator 64 should be about the same when the hydraulic sub-systems are at equal pressure, it has been found convenient to utilize a shim 80 as shown in FIG. 10. Shim 80 is secured to the actuator 64 by means of pin 85a and serves to equalize the spacing between the shoulders on pistons 32 and 33 and on actuator 64 at the time the pistons are each pressurized to the same extent. Under these circumstances, then, should failure occur in either sub-system the amount of travel before direct drive take-over is encountered will be the same.

The same apparatus may be used on an automotive vehicle where the front wheel cylinder cups and the rear wheel cylinder cups are the same size by simply removing the shim 80. In the same manner, if the rear wheel cups should happen to be of the larger size than the front wheel brake cylinders then the shim may be used adjacent shoulder 72.

The end 81 of piston actuator 64 adjacent fire wall 21 is detachably mounted on an enlarged removable flange or head 82 on pitman rod 19. Flange 82 is suitably secured to the rod end 79 as by the illustrated threads coacting in a tapped bore in the end of pitman 19. Flange 82 is slidably received in a complementarily configured recess or slot 83 formed between the adjacent actuator surface 84 and an arcuate or U-shaped cover 85 secured to or integral with the actuator 64 in spaced relation from the surface 84. Slot 83 and cover 85 are oversized with respect to the size of flange 82 so as to permit limited movement of the pitman head or flange 82 therein. Such movement is necessary because of the manner in which the pitman rod 19 is linked to the brake pedal arm 20.

In assembling the apparatus, the brake pedal arm 20 and pitman rod or bar 19 are first mounted in the cab of the vehicle and a brake pedal 20 slightly depressed to move the pitman rod through the fire wall 21 into the engine housing area. Flange head 82 is secured to the end of rod 79 by any suitable means, such as thread means, and when in position, abuts against the fire wall 21 and serves to maintain the pitman rod in position. As best shown in FIG. 2 the pitman rod 19 is biased in a direction away from the master cylinder assembly 18 by a helix spring 91 coacting between the fire wall 21 and an annular flange or stop 92 with the pitman rod 19. Spring 91 coacts between thrust washer 93 and collar 92 to reset the brake pedal and also surrounds a flexible dirt shield or boot 94 which serves to seal off the opening through fire wall 21 and prevent dust and dirt from entering the activator assembly.

The master cylinder assembly 18 may then be easily mounted on the fire wall by any suitable means, e.g. bolts 86 and the flanged head 82 inserted in slot 83 in the end of actuator 64. It will be seen that this structure greatly facilitates installation and removal of the master piston actuating assembly. A gasket 87 is preferably placed between the assembly 18 and the fire wall 21.

Referring more particularly to FIGS. 6 to 8 and 11 there is shown in greater detail a fluid reservoir assembly 17. The reservoir assembly 17 comprises two compartmented sections or reservoirs 25 and 26 separated from each other by partition wall 106. Thus, each hydraulic sub-system has its own supply of hydraulic fluid. A pliable sealing gasket 100 is provided between the cap 103 and the reservoir body 101, said sealing gasket being provided with a plurality of breather holes 102 communicating with each of the reservoir sections 25 and 26 to allow movement of air. Cover 103 is secured to the assembly 17 by any suitable fastening means, such as a bolt 104 threadably secured in tapped hole 105.

Figure 7:
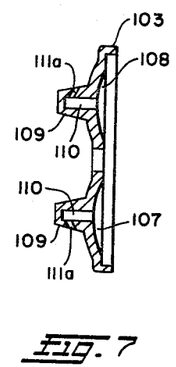
FIG. 7 is a cross-sectional view of the fluid reservoir cover shown in FIG. 6 as it appears in the plane indicated by the line 7—7 of FIG. 6.
Figure 8:
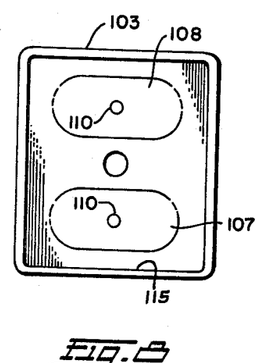
FIG. 8 is a bottom view of the fluid reservoir cover shown in FIGS. 6 and 7.

Cover 103 is provided with a pair of spaced apart bulbed portions or air pockets 107 and 108 which, when the cover is in position on the reservoir body 101 are disposed above each of the reservoir portions 25 and 26, respectively. These pockets provide a suitable minimum of air space over the surface of the hydraulic fluid in each of the reservoir portions 25 and 26 to allow for movement of the fluid in each of the hydraulic sub-systems. In order to permit the sub-systems to "breathe" vents 109 are provided, usually as integrally cast members with the cast cover 103. As best shown in FIG. 7 each vent 109 has a protected passageway 110 extending from the underside of the cover 103, and communicating with a downwardly directed lateral port 111a open to the atmosphere. The downwardly directed port 111a is conveniently disposed in the vent 109 so that foreign matter will not readily enter it and contaminate the hydraulic fluid in the reservoirs. Flange 115 (FIG. 8) is sized relative to gasket 100 to retain gasket 100 frictionally within cap 103. Cap 103 is desirably oblong so that it is automatically properly positioned with respect to the gasket 100 and the reservoir. Assembly of the reservoir with the cap 103, the gasket 100 and the bolt 104 is readily apparent from FIG. 11. The breather ports or holes 102 in gasket 100 allow for movement of air to or from chambers 107 and 108, and the reservoir chambers 25 and 26, respectively. Breather ports 102 are so located as to be out of alignment with ports 27 and 28 in each of the reservoir chambers 25 and 26. The reason for this is that when chamber 15, for example, is pressurized fluid spurts through the port 27 until port 27 is sealed off by movement of resilient cup 46 past the opening of port 27. When the brakes are suddenly applied, a jet of hydraulic fluid is formed having sufficient force to impinge against the gasket 100. Accordingly, gasket 100 desirably serves also as a baffle to prevent escape of hydraulic fluid.

In order to keep the pistons 32 and 33 within their respective cylinders 12 and 15 when the master piston actuator assembly 18 is removed from fire wall 21, there are provided a pair of retaining screws 111 and 112 (FIG. 3). Screws 111 and 112 are threaded into the cylinders 12 and 15, respectively, and serve to engage the piston lands 37 and thereby limit the extent or rearward travel of pistons 32 and 33 under the influence of springs 45 (FIG. 2) when the assembly is removed from the fire wall. After reinstalling the piston actuator assembly 18 and coupling it to the flange head 82 on pitman rod 19, and securing the piston actuator body flange 90 to fire wall 21 by means of bolts 86, the retaining screws 111 and 112 remain fully inserted, but are prevented from any interference with the movement of pistons 32 and 33, by the fire wall gasket 87 against which ends 88, 89 and 89a (FIG. 9) abut.

Figure 12:
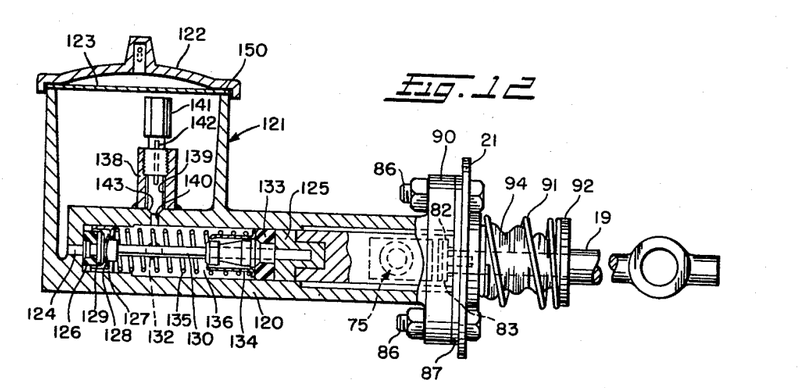
FIG. 12 is a cross-sectional view of another embodiment of the master piston actuator of the present invention showing a different fluid actuating structure.

FIG. 12 illustrates the embodiment of the present invention in a different type of hydraulic brake actuator mechanism enjoying wide popularity in Europe. In this device, the structure of the actuator mechanism for the pistons is essentially the same as shown in FIGS. 2, 3, 5, and 9. The reservoir assembly, and the apparatus for feeding hydraulic fluid under pressure to the wheel cylinders for actuating the braking mechanism, whether of the disc or drum type, is somewhat different.

The apparatus shown in FIG. 12 provides, therefore, a cylinder body 120 integral with a reservoir 121 having a cap 122 and a gasket 123. Reservoir 121 is of substantially the same design as reservoir assembly 17 as shown in FIG. 2, for example. However, the means for feeding hydraulic fluid into the hydraulic sub-system is somewhat different, the inlet port 124 being provided at the extremity of the cylinder rather than intermediate the extremities of the cylinder bore as in the device shown in FIG. 2. Valve means are provided to close inlet port 124 on the pressurizing stroke of plunger 125, and include a resilient center valve seal 126, a valve spacer 127 a spring washer 128 and a valve 129 at the extremity of valve stem 130. Outlet port 132 communicates with one of the hydraulic sub-systems such as hydraulic line 13 (FIG. 1). The plunger 125 is provided with an elastomeric plunger seal 133 against which there is held in abutting relation spring thimble 134 by means of compression spring 135. On the pressurizing stroke moving from right to left as shown in FIG. 12, valve 129 is seated against resilient valve seat 126 closing inlet port 124 to the flow of hydraulic fluid from reservoir 121. The hydraulic fluid then trapped within chamber 136 is pressurized and forced through the side outlet 132.

In order to bleed air out of the system, there may be integrally cast with the cylinder housing 120 an elongated member 138 which is drilled to provide an oversized bore 139, and counterbore to provide an opening 140 into the fluid chamber 136. The outer portion of the elongated member 138 is tapped to receive bleeding pin 141 which acts as a valve with respect to opening 140 closing the opening by seating thereon, pin 141 being provided with a keyway 142 to exhaust air when pin 141 is backed off of its seat 143. The uppermost portion of keyway 142 is desirably maintained below the fluid level in reservoir 121 so that on the return stroke, no air is drawn into the system. Pin 141, however, desirably has a hex-head shape to receive a suitable wrench, the top-most portion of pin 141 being desirably just below the upper lip 150 of reservoir 121.

In all other respects, the structure of the apparatus or device shown in FIG. 12 is the same as that shown in FIGS. 3 and 2.

Figure 13:
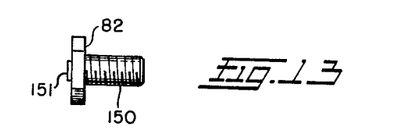
FIG. 13 is an elevation of a coupler flange and threaded shank for the distal end of the pitman drive bar.

FIG. 13 is a side view of the flange 82 showing a threaded stud 150 for securing it to the end of pitman 19. There is provided also a projection or boss 151 on the exposed or forward face of flange 82 which coacts with the rear surface 84 of actuator 64 to facilitate the slight rocking action which will be undergone by pitman 19 during its operation by the foot pedal.

Figure 14:
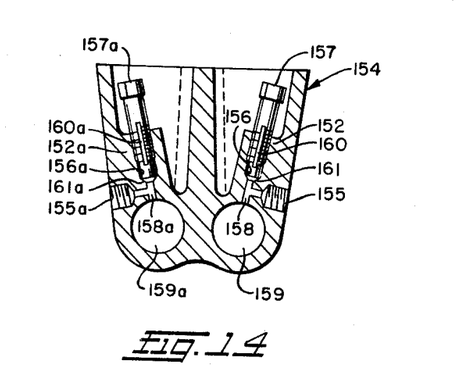
FIG. 14 is a cross-sectional view of a modified reservoir showing an improved air bleeder and interior structure for use with the type of actuator shown in FIG. 12.

FIG. 14 shows a cross section of another embodiment of a reservoir particularly useful with the structure shown in FIG. 12. In this embodiment, the bleeder bosses 152a and 152 are integrally cast with the actuator body 154 and drilled and tapped for direct communication with the fluid outlets 155a and 155, respectively. Bosses 152a and 152 are each obliquely drilled to provide an oversized bore 156a and 156 which is suitably tapped to receive bleeder pins 157a and 157 respectively; and counterbored to provide ports 158a and 158 communicating with cylinders 159a and 159, respectively. Pins 157a and 157 are provided with a key-way type slot 160a and 160 for allowing escape of air when the pins are backed off seats 161a and 161. In all other respects, these bleeders function as the bleeder illustrated in FIG. 12.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The combination in a hydraulic fluid system having a pair of isolated hydraulic sub-systems each including a master cylinder, said master cylinders being disposed in parallel relation to each other, hydraulic fluid supply means for each of said sub-systems, a piston coacting in each of said master cylinders for forcibly moving fluid in each of said sub-systems, and unitary driving means for driving said pistons in a fluid displacing direction, including:
   (a) a rocking beam cross member coacting between said pistons to transmit an axial force to each of said pistons proportional to the hydraulic resistance of each sub-system;
   (b) a piston actuator disposed between adjacent pistons and slidably movable relative to each of said pistons predetermined distances and coacting between said driving means and said rocking beam cross member to transmit axially directed components of force from said driving means to said cross member for at least a portion of the stroke of said actuator; and
   (c) means coacting directly between said actuator and each of said adjacent pistons for transmitting axially directed components of force from said driving means directly to either one of said pistons when the hydraulic resistance of the sub-system actuated by the other of said pistons falls below a predetermined value.

2. The combination of claim 1 wherein the rocking beam cross member is joined to the pistons through a ball and socket joint.

3. The combination in a hydraulic fluid brake system having a pair of hydraulic sub-systems each including a master cylinder, and at least one auxiliary brake actuating hydraulic cylinder, said master cylinders being disposed in parallel relation to each other, hydraulic fluid supply means for each of said sub-systems, a piston coacting in each of said master cylinders for forcibly moving fluid in each of said sub-systems, and manually actuated driving means for driving said pistons in a fluid displacing direction including:
   (a) a rocking beam cross member coacting between said pistons to transmit an axial force to each of said pistons proportional to the hydraulic resistance of each sub-system;
   (b) a piston actuator disposed between adjacent pistons and slidably movable relatively to each of said pistons predetermined distances and coacting between said driving means and said rocking beam cross member to transmit axially directely components of force from said driving means to said cross member for at least a portion of the stroke of said actuator; and
   (c) means coacting directly between said actuator and each of said adjacent pistons for transmitting axially directed components of force from said driving means directly to either one of said pistons when the hydraulic resistance of the sub-system actuated by the other of said pistons falls below a predetermined value.

4. The combination in a hydraulic fluid brake system having a pair of hydraulic sub-systems each including a master cylinder and at least one auxiliary brake actuating hydraulic cylinder, said master cylinders being disposed in parallel relation to each other, hydraulic fluid supply means for each of said sub-systems, a piston coacting in each of said master cylinders for forcibly moving fluid in each of said sub-systems, and manually actuated driving means for driving said pistons in a fluid displacing direction including:
   (a) adapter means at the driving extremity of each of said pistons, said adapter means being adjacently disposed;
   (b) a rocking beam cross member coacting between said adapters to transmit an axial force to each of said pistons proportional to the hydraulic resistance of each sub-system;
   (c) a piston actuator disposed between said adapter means and slidably movable relative thereto and coacting between said driving means and said rocking beam cross member to transmit axially directed components of force from said driving means to said cross member for at least a portion of the stroke of said actuator; and
   (d) means coacting directly between said actuator and each of said adjacently disposed adapter means for transmitting axially directed components of force from said driving means directly to either one of said pistons when the hydraulic resistance of the sub-system actuated by the other of said pistons falls below a predetermined value.

5. The combination of claim 4 which includes releasable coupling means coacting between the driving means and said actuator.

6. The combination of claim 5 in which the coupling means includes:
   (a) a flange member including a projecting stud portion, and
   (b) a flange receiving and retaining slot.

7. The combination of claim 6 in which the stud portion of the flanged member is secured to the driving means and the slot is formed in the piston actuator.

8. The combination of claim 5 in which the coupling means includes:
   (a) a flange member including a stud portion projecting from one surface for securing to said driving means and a centrally disposed boss projecting from the other surface;
   (b) a flange receiving and retaining slot in said actuator including a U-shaped collar coacting to restrain said flange from axial movement, said flange being slidable in a trans-axial direction for seating behind said collar to dispose the stud portion between the open arms of said collar.

9. The combination in a hydraulic fluid brake system having a pair of hydraulic sub-systems each including a master cylinder and at least one auxiliary brake actuating hydraulic cylinder, said master cylinders being disposed in parallel relation to each other, hydraulic fluid supply means for each of said sub-systems, a piston coacting in each of said master cylinders for forcibly moving fluid in each of said sub-systems, and manually actuated drive means for driving said pistons in a fluid displacing direction including:
   (a) cylindrical adapters at the driving extremity of each of said pistons and each having a pair of axially contiguous flats defining a shoulder, said flats on each of said adapters being in confronting relation;

(b) a socket in one of said flats in each of said adapters, said sockets being in alignment;

(c) a rocking beam cross member coacting between the sockets in said adapters to transmit an axial force to each of said pistons proportional to the hydraulic resistance of each sub-system including a centrally disposed circumferential fulcrum;

(d) a cylindrical piston actuator disposed between said cylindrical adapters including a pair of parallel radially disposed flats for confronting parallel disposition relative to the socket-containing flats of said adapters, and defining diametrically opposed actuator shoulders:

(e) a bore having an axis perpendicular to said actuator flats for receiving and coacting with said circumferential fulcrum to transmit axially directed components of force from said driving means to said cross member for at least a portion of the stroke of said actuator; and (f) means coacting between said actuator and each of said adjacent pistons for transmitting axially directed components of force from said driving means directly to either one of said pistons when the hydraulic resistance of the sub-system actuated by the other of said pistons falls below a predetermined value.

10. The combination of claim 9 including removable shim means adjacent at least one of said actuator shoulders.

11. The combination in a hydraulic fluid brake system having a pair of hydraulic sub-systems each including a master cylinder and at least one auxiliary brake actuating hydraulic cylinder, said master cylinders being disposed in parallel relation to each other, hydraulic fluid supply means for each of said sub-systems, a piston coacting in each of said master cylinders for forcibly moving fluid in each of said sub-systems, and manually actuated drive means for driving said pistons in a fluid displacing direction including:

(a) cylindrical adapters at the driving extremity of each of said pistons and each having a pair of axially contiguous flats defining a shoulder, said flats on each of said adapters being in confronting relation;

(b) a socket in one of said flats in each of said adapters, said sockets being in alignment;

(c) a rocking beam cross member coacting between the sockets in said adapters to transmit an axial force to each of said pistons proportional to the hydraulic resistance of each sub-system including a centrally disposed circumferential fulcrum;

(d) a cylindrical piston actuator disposed between said cylindrical adapters including a pair of parallel radially disposed flats for confronting parallel disposition relative to the socket-containing flats of said adapters, and defining diametrically opposed actuator shoulders;

(e) a bore having an axis perpendicular to said actuator flats for receiving and coacting with said circumferential fulcrum to transmit axially directed components of force from said driving means to said cross member for at least a portion of the stroke of said actuator; and (f) means coacting between said actuator and each of said adjacent pistons for transmitting axially directed components of force from said driving means directly to either one of said pistons when the hydraulic resistance of the sub-system actuated by the other of said pistons falls below a predetermined value;

(g) coupling means coacting between said driving means and said actuator including:

(1) a flange member including a stud portion projecting from one surface for securing to said driving means and a centrally disposed boss projecting from the other surface, (2) a flange receiving and retaining slot in said actuator including U-shaped collar coacting to restrain said flange from axial movement, said flange being slidable in a trans-axial direction for seating behind said collar to dispose the stud portion between the open arms of said collar.

12. A device for moving a pair of pistons along parallel axes in unison and for differentially moving one piston relative to the other, including an actuator movable along an axis parallel to the piston axes and having an opening transversely extending through it, and means for transferring force applied to the actuator to the pistons comprising:

(a) a wobble bar freely disposed in the opening, the ends of the bar extending from the opening and engaging the pistons to transfer force applied to the bar by the actuator to the pistons;

(b) a ball disposed on the wobble bar within the opening for engaging the walls of said opening, said bar coacting to transfer the force applied to the actuator to the bar and acting as a fulcrum about which the bar rotates when the pistons encounter different fluid pressures;

(c) the ends of said wobble bar being engaged in sockets disposed in each of said pistons.

13. The combination in a hydraulic fluid system having a pair of isolated hydraulic sub-systems, each including a master cylinder, said master cylinders being disposed in parallel relation to each other, hydraulic fluid supply means including a reservoir for each of said sub-systems, a piston coacting in each of said master cylinders for forcibly moving fluid in each of said sub-systems, and unitary driving means for driving said pistons in a fluid displacing direction, including (a) a rocking beam cross member coacting between said pistons to transmit an axial force to each of said pistons proportional to the hydraulic resistance of each sub-system;

(b) a piston actuator disposed between adjacent pistons and slidably movable relative to each of said pistons predetermined distance and coacting between said driving means and said rocking beam cross member to transmit axially directed components of force from said driving means to said cross member for at least a portion of the stroke of said actuator;

(c) means coacting directly between said actuator and each of said adjacent pistons for transmitting axially directed components of force from said driving means directly to either one of said pistons when the hydraulic resistance of the sub-system actuated by the other of said pistons falls below a predetermined value, and (d) means for bleeding off trapped gases in said master cylinders, said means including a boss integral with each of said reservoirs, a bore in said boss communicating with each said master cylinder, and a valve pin coacting in each said bore to selectively open and close said bore for removal of trapped gases from each said master cylinder, respectively.

14. The reservoir of the preceding claim 13 in which the valve pin includes a longitudinal keyway slot intermediate the extremities of said pin for passage of gas from said bore to said reservoir cavity.

15. A reservoir in accordance with claim 14 in which the gas exit from said keyway is disposed below the normal level of fluid in said reservoir.

16. A reservoir in accordance with claim 15 in which the outer extremity of said valve pin extends toward the mouth of said reservoir for easy access.

(References on following page)

References Cited

UNITED STATES PATENTS

| | | | |
|---|---|---|---|
| 2,074,718 | 3/1937 | Bohannan | 188—204 X |
| 2,191,987 | 2/1940 | Goepfrich | 188—204 X |
| 2,284,669 | 6/1942 | Masteller | 60—54.6 |
| 2,319,368 | 5/1943 | Schnell | 60—54.6 X |
| 2,459,394 | 1/1949 | Sawtelle | 188—204 |
| 2,559,850 | 7/1951 | Davis | 188—204 |
| 2,596,119 | 5/1952 | Blackman | 60—54.6 |
| 2,857,584 | 10/1958 | Gibson | 60—54.6 X |
| 3,021,677 | 2/1962 | Miller | 60—54.6 |
| 3,153,328 | 10/1964 | Seethaler | 60—54.6 |
| 3,220,189 | 11/1965 | Caramanna | 60—54.6 |

MARTIN P. SCHWADRON, *Primary Examiner.*

ROBERT R. BUNEVICH, *Examiner.*